(12) United States Patent
Lochmueller

(10) Patent No.: US 7,510,208 B1
(45) Date of Patent: Mar. 31, 2009

(54) STROLLER PACK

(76) Inventor: Jennifer Lochmueller, 1612 Crossridge Dr., Brandon, FL (US) 33510

( * ) Notice: Subject to any disclaimer, the term of this patent is extended or adjusted under 35 U.S.C. 154(b) by 0 days.

(21) Appl. No.: 12/044,007

(22) Filed: Mar. 7, 2008

(51) Int. Cl.
*B62B 7/08* (2006.01)

(52) U.S. Cl. .................. 280/650; 280/647; 280/639; 280/638; 280/9; 280/20; 280/32.6; 280/47.25; 280/47.18; 280/47.21; 280/47.27; 280/47.33; 280/87.05; 280/278

(58) Field of Classification Search .......... 280/650, 280/647, 639, 638, 9, 20, 32.6, 47.25, 47.21, 280/47.33, 87.05, 278
See application file for complete search history.

(56) References Cited

U.S. PATENT DOCUMENTS

| | | | |
|---|---|---|---|
| 5,143,398 A | 9/1992 | Teng | |
| 5,354,079 A | 10/1994 | Hettenbach | |
| 5,718,444 A | 2/1998 | Huang | |
| 5,823,564 A | 10/1998 | Kettler | |
| 6,062,589 A | 5/2000 | Cheng | |
| 6,105,997 A | 8/2000 | Watkins | |
| 6,843,499 B2 * | 1/2005 | Guo | 280/642 |
| 6,854,758 B2 | 2/2005 | Hou | |
| 6,929,230 B2 * | 8/2005 | Tsai | 348/436 |
| 7,108,275 B2 * | 9/2006 | Yeh et al. | 280/647 |
| 7,176,228 B2 | 1/2007 | Faber | |
| 7,264,957 B2 * | 9/2007 | Paul et al. | 435/235.1 |
| 7,296,820 B2 * | 11/2007 | Valdez et al. | 280/647 |
| 7,422,230 B2 * | 9/2008 | Chuan | 280/642 |

* cited by examiner

*Primary Examiner*—Christopher P Ellis
*Assistant Examiner*—Cynthia F Collado

(57) ABSTRACT

A portable stroller that includes a collapsible frame that has two Y-shaped support units and a plurality of links which collapsibly mount a seat section thereon.

6 Claims, 1 Drawing Sheet

STROLLER PACK

TECHNICAL FIELD OF THE INVENTION

The present invention relates generally to land vehicles, and more particularly to a collapsible stroller for transporting a child.

BACKGROUND OF THE INVENTION

Ever since babies have been born, parents have looked for a convenient way of traveling with their children. From slings to pouches, babies have been transported in a number of ways. Today we do it a bit differently, but how did we get our modern day strollers? Where did it all start?

The idea of a baby stroller first came into being with a man named William Kent. He was a garden architect in England who had become very well known for his work. In 1733, the Duke of Devonshire asked Kent to build a means of transportation that would amuse his children. Kent obliged by constructing a shell shaped basket on wheels that the children could sit in. This was richly decorated and meant to be pulled by a goat or small pony. Kent's idea caught on and soon other royal families owned similar contraptions.

In 1840, the baby carriage became extremely popular. Queen Victoria bought three carriages from Hitchings Baby Store. Though these models were very tall and relatively unsafe, but they were in fashion. If you wanted to be part of high society, you had to own a baby carriage.

The carriages of those days were much different than today. They were built of wood or wicker and held together by expensive brass joints. These were very fancy and became heavily ornamented works of art. Models were also named after royalty. Princess and Duchess were popular names, as well as Balmoral and Windsor.

Up until this time, baby carriages had always been pulled by a pony or dog, but in 1848, a new design appeared. American Charles Burton decided to put handles on carriages so that the parents could actually use the vehicle as a means of transporting their children. This idea was not accepted in America, so Burton moved to England and was hired by individuals such as Queen Victoria, Queen Isabella, and the Pasha of Egypt.

In June of 1889, a new carriage design came on to the public scene. William Richardson patented his idea of the first reversible stroller. The bassinet was designed so it could face out or in towards the parent. He also made structural changes to the carriage. Until then, the axils did not allow each wheel to move separately.

Richardson's design allowed this, which increased maneuverability of the carriages. As the 1920s, began, World War I was coming to an end. Modern baby carriages were now available to all families. They were also becoming safer, as new features like larger wheels, brakes, deeper prams, and lower, sturdier frames began to appear. By 1950, these carriages were a must have for all families.

In 1965, Owen Maclaren, an aeronautical engineer, listened to his daughter complain about traveling from England to America with her heavy pram. Maclaren knew that she needed something with a light frame that could fold up compactly. Using his knowledge of airplanes, Maclaren built an aluminum frame and created the first true umbrella stroller. This design took off and soon strollers were easier to transport and used everywhere.

By 1980, another huge step in stroller design was taken. Phil Baechler decided he wanted to do some running and take his son with him. He saw that the stroller he owned would never hold up to this activity, so he took the wheels off his bike and tried it out. After several attempts he finally worked out the Baby Jogger design.

Since the 1980s, the stroller industry has grown leaps and bounds. New features, safer construction, and more accessories have opened up a whole new world to parents of infants and toddlers.

Collapsible strollers for babies and small children are well known and widely used. Known collapsible strollers, however, fold into a bulky and outsize configuration. Some provide for folding and carrying on the back of an adult, however they fold into a bulky, inconvenient collapsed configuration. Some collapsible strollers are inherently uncomfortable for the child. Although it is known to provide a folding configuration which may be placed in a carrying case and carried by a handle by an adult, the configuration remains bulky and relatively difficult to carry, handle, and store. It would be desirable to provide a collapsible stroller for a child which is inherently comfortable for the child. It would further be desirable if such a collapsible stroller would assume a generally cylindrical collapsed configuration for fitting in a soft, duffle-type bag having straps for convenient carrying on the back of an adult. This type of duffle bag is easily folded and compactly stored and carried by an adult when the collapsible stroller is erect and in use. The typical umbrella stroller is great while in use, however, when it is not in use, it is too bulky to carry into malls, amusement parks, etc.

Therefore there is a need for a stroller that is lightweight and compact.

SUMMARY OF THE INVENTION

These and other objects are achieved by a stroller that is lightweight and compact and will fold easily into an average size backpack. The stroller of the present invention permits an entire umbrella stroller, including the wheels, to be folded flat enough, so that it can be carried as a backpack. The backpack can include a cooler compartment that would enable a user to keep drinks cold.

While the stroller disclosed herein includes two wheels, it is contemplated that the stroller can also include four swivel wheels, rather than two for added flexibility in turns and tight spaces.

Using the stroller embodying the principles of the present invention, a user will never let a child get too tired. Furthermore, the stroller of the present invention can fit in a backpack that could be small enough to take wherever it is needed, and has the option of pulling out a portable stroller out of a backpack when a child gets tired. The stroller of the present invention makes it easy and convenient for a user to carry a backpack that would contain an umbrella stroller.

DETAILED DESCRIPTION OF THE INVENTION

Figure 1:
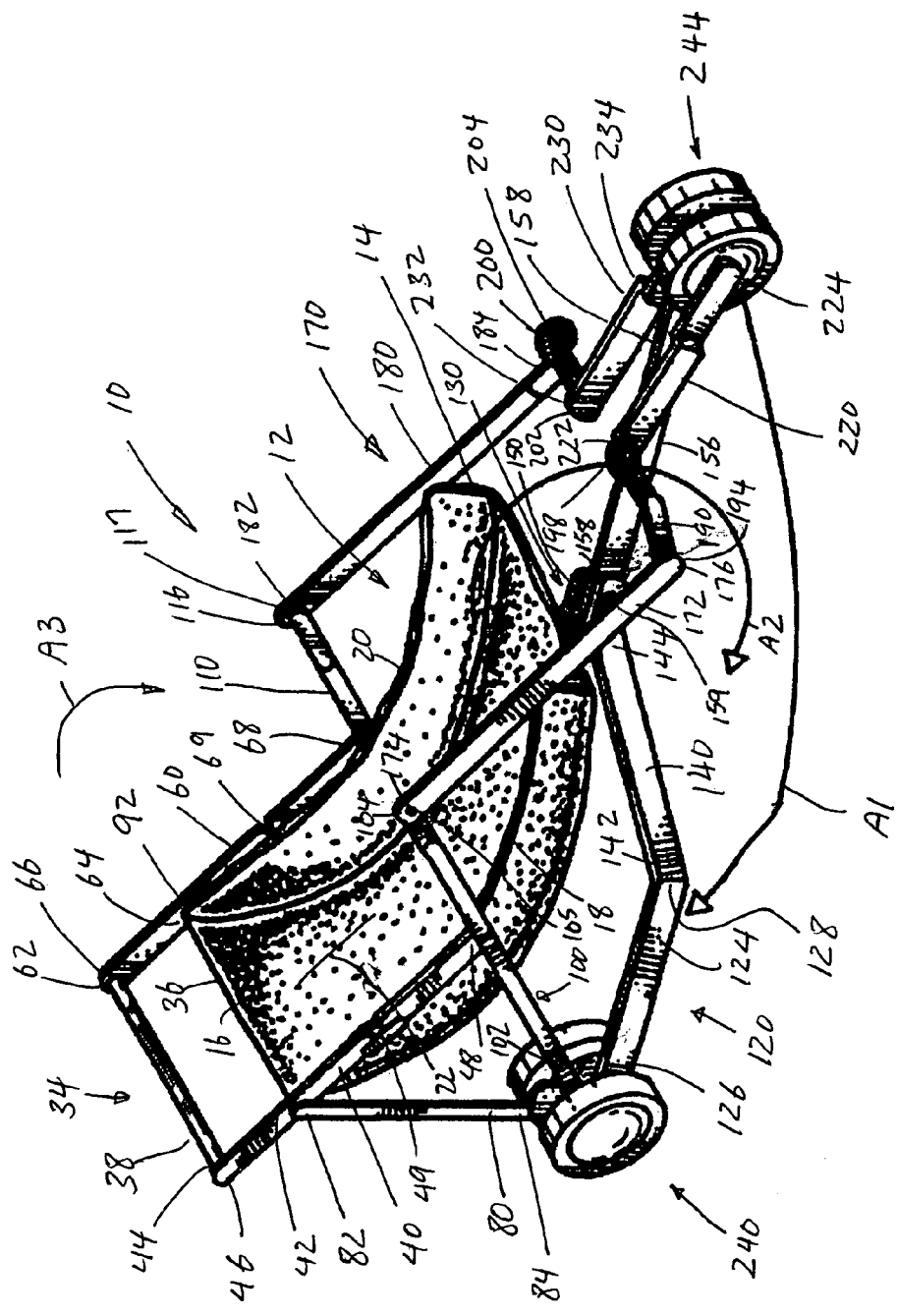
FIG. 1 is a perspective view showing a stroller embodying the principles of the present invention in a set up condition.

Other objects, features and advantages of the invention will become apparent from a consideration of the following detailed description and the accompanying drawing figures.

Referring to the drawing figures, it can be understood that the principles of the present invention are embodied in a stroller 10 for carrying a child comprises a seat section 12 on which a child rests when stroller 10 is in use. Seat section 12 is preferably formed of flexible material that will be comfortable to the child and will be easily collapsed and deployed as will be understood from the teaching of this disclosure. The seat section includes a first end 14 which is a forward end when the seat section is in use, a second end 16 which is a rear end when the seat section is in use, a first side 18 which extends between the first end of the seat section and second end 16, a second side 20 which extends between first end 16 second end 18 of the seat section and a longitudinal axis 22 which extends between first end 16 and second end 18 of the seat section.

A frame section 30 to which the seat section is attached, the frame section includes a handle unit 34 which is located adjacent to the second end of the seat section and which includes a first cross bar 36 attached to second end 16 of the seat section and which extends between first side 18 of the seat section and second side 20 of the seat section. Handle unit 34 further includes a second cross bar 38 that is spaced apart from first cross bar 36 and which extends between the first side of the seat section and the second side of the seat section.

A first support arm 40 is located adjacent to the first side of the seat section and connects one end 42 of the first cross bar to one end 44 of the second cross bar. The first support arm includes a first end 46 which is connected to the one end 42 of the second cross bar 38 and a second end 48 which is spaced apart from the one end of the first cross bar. The first support arm 40 may pivot about a pivot point 49 located between the first end 46 and the second end 48. A second support arm 60 is located adjacent to second side 20 of the seat section and connects a second end 62 of the second cross bar to a second end 64 of the first cross bar. Second support arm 60 includes a first end 66 connected to the second end of the second cross bar and a second end 68 which is spaced apart from the second end of the first cross bar. The second support arm 60 may pivot about a pivot point 69 located between the first end 66 and the second end 68.

A first support element 80 has a first end 82 pivotably connected to first support arm 40 adjacent to the one end 48 of the first cross bar of the handle unit and a second end 84. A second support element 90 has a first end 92 pivotably connected to the second support arm adjacent to the second end of the first cross bar of the handle unit and a second end 94.

A first connecting link 100 is located adjacent to the first side of the seat section and includes a first end 102 pivotably connected to second end 84 of the first support element, and a second end 104 located adjacent to the first side of the seat section. The second end of the first support arm is pivotably connected about a pivot point 105 to the first connecting link adjacent to the first side of the seat section. A second connecting link 110 is located adjacent to the second side of the seat section and includes a first end pivotably connected to the second end of the second support element and a second end 116 located adjacent to the second side of the seat section. The second end 68 of the second support arm is pivotably connected about a pivot point 117 to the second connecting link 110 adjacent to the second side of the seat section.

Y-shaped support unit 120 includes a first leg 124 having a first end 126 pivotably connected to the second ends of the first support element and the first connecting link, and a second end 128. Unit 120 further includes a second leg 130 having similar construction as the first leg 124 to support a third wheel (not shown), which is on the second side 20. A first transverse leg 140 has one end 142 connected to the second end of the first leg of the Y-shaped support unit and a second end 144. A second transverse leg 150 is provided, which is similar construction as the first traverse leg 40. The second end of the first transverse leg is located closely adjacent to the second end of the second transverse leg and both second ends are located adjacent to the longitudinal axis of the seat section. A longitudinal leg 156 extends in the direction of the longitudinal axis of the seat section and has a first end 158 pivotably connected to the second ends of the first and second transverse legs of the Y-shaped support unit about a pivot point 159. Leg 156 has a second end 158. The longitudinal leg of the Y-shaped support unit extends beyond the first end of the seat section when the stroller is in the set up configuration shown in FIG. 1.

A block Y-shaped support unit 170 includes a first leg 172 which has a first end 174 pivotably connected to the second end of the first connecting link and a second end 176. Unit 170 further includes a second leg 180 which has a first end 182 pivotably connected to the second end of the second connecting link and a second end 184. Unit 170 further includes a first transverse leg 190 which has a first end 194 connected to the second end of the first leg of the block Y-shaped support unit and a second end 198. Unit 170 further includes a second transverse leg 200 which has a first end 202 connected to the second end of the second leg of the block Y-shaped support unit and a second end 204. The second ends of the first and second legs of the block Y-shaped support unit are spaced apart from the first end of the seat section. As can be understood from FIG. 1, the seat unit is attached to the legs of the block Y-shaped support unit to move therewith and to be supported thereby when the stroller is in the deployed configuration. Unit 170 further includes a first longitudinal arm 220 which has a first end 222 connected to the second end of the first transverse leg of the block Y-shaped support unit and a second end 224 and a second longitudinal arm 230 having a first end 232 connected to the second end of the second transverse leg of the block Y-shaped support unit and a second end 234.

A first wheel unit 240 is rotatably connected to the second ends of the first support arm, the first connecting link and the first leg of the Y-shaped support unit, a second wheel unit is rotatably connected to the second ends of the second support arm, the second connecting link and the second leg of the Y-shaped support unit, and a third wheel unit 244 is rotatably connected to the second ends of the longitudinal leg of the Y-shaped support unit, the first longitudinal arm of the block Y-shaped support unit and the second longitudinal arm of the block Y-shaped support unit.

As can be understood from arrows $A_1$, $A_2$ and $A_3$, the seat section and the frame section are collapsible to move between a deployed orientation and a folded orientation. In the deployed orientation, the wheel units is spaced apart from the seat section, and in the folded orientation, the wheel units are closely adjacent to the seat section with the third wheel unit located between the first and second wheel units.

As can be understood from the foregoing, the frame unit supports the seat unit when the stroller is in use and includes two Y-shaped supporting units and links connecting the frame units together in a manner which allows the two frame units to collapse on each other and lie adjacent to the seat unit in a collapsed configuration and to extend into a seat unit supporting orientation in a deployed orientation. The wheel units are connected to the frame units in a manner to be pivotable between a deployed condition in which the wheel units are oriented to roll over a supporting surface and a stored condition in which the wheel units are oriented at an angle with respect to the deployed condition.

For example, to fold the stroller 10 from the deployed orientation shown in FIG. 1, the third wheel unit 244 may be moved towards the first wheel unit 240 by rotating about the pivot point 159, as indicated by the direction arrow A1. The causes the first leg 172 and the second leg 180 to pivot about their respective pivot points 105 and 117, as indicated by the direction arrow A2. Then the first support arm 40 and the second support arm 60 may pivot about their respective pivot points 49 and 69, as indicated by the direction arrow A3. To unfold the stroller, the steps discussed above in reference to direction arrows A1, A2, and A3 may be reversed.

It is understood that while certain forms of the present invention have been illustrated and described herein, it is not to be limited to the specific forms or arrangements of parts described and shown.

What is claimed is:

1. A stroller for carrying a child comprising:
   A) a seat section on which a child rests when in use, the seat section including a first end which is a forward end when the seat section is in use, a second end which is a rear end when the seat section is in use, a first side which extends between the first end of the seat section and the second end of the seat section, a second side which extends between the first end of the seat section and the second end of the seat section, and a longitudinal axis which extends between the first end of the seat section and the second end of the seat section;
   B) a frame section to which the seat section is attached, the frame section including
      (1) a handle unit which is located adjacent to the second end of the seat section and which includes
         (a) a first cross bar attached to the second end of the seat section and which extends between the first side of the seat section and the second side of the seat section,
         (b) a second cross bar that is spaced apart from the first cross bar and which extends between the first side of the seat section and the second side of the seat section,
         (c) a first support arm which is located adjacent to the first side of the seat section and which connects one end of the first cross bar to one end of the second cross bar, the first support arm including a first end which is connected to the one end of the second cross bar and a second end which is spaced apart from the one end of the first cross bar, and
         (d) a second support arm which is located adjacent to the second side of the seat section and which connects a second end of the second cross bar to a second end of the first cross bar, the second support arm including a first end which is connected to the second end of the second cross bar and a second end which is spaced apart from the second end of the first cross bar,
      (2) a first support element having a first end pivotably connected to the first support arm adjacent to the one end of the first cross bar of the handle unit and a second end,
      (3) a second support element having a first end pivotably connected to the second support arm adjacent to the second end of the first cross bar of the handle unit and a second end,
      (4) a first connecting link located adjacent to the first side of the seat section and including
         (a) a first end pivotably connected to the second end of the first support element, and
         (b) a second end located adjacent to the first side of the seat section,
      (5) the second end of the first support arm being pivotably connected to the first connecting link adjacent to the first side of the seat section,
      (6) a second connecting link located adjacent to the second side of the seat section and including
         (a) a first end pivotably connected to the second end of the second support element, and
         (b) a second end located adjacent to the second side of the seat section,
      (7) the second end of the second support arm being pivotably connected to the second connecting link adjacent to the second side of the seat section,
      (8) a Y-shaped support unit which includes
         (a) a first leg having a first end pivotably connected to the second ends of the first support element and the first connecting link, and a second end,
         (b) a second leg having a first end pivotably connected to the second ends of the second support element and the second connecting link, and a second end,
         (c) a first transverse leg having one end connected to the second end of the first leg of the Y-shaped support unit and a second end,
         (d) a second transverse leg having one end connected to the second end of the second leg of the Y-shaped support unit and a second end, the second end of the first transverse leg being located closely adjacent to the second end of the second transverse leg and being located adjacent to the longitudinal axis of the seat section, and
         (e) a longitudinal leg which extends in the direction of the longitudinal axis of the seat section and which has a first end pivotably connected to the second ends of the first and second transverse legs of the Y-shaped support unit, and a second end, the longitudinal leg of the Y-shaped support unit extending beyond the first end of the seat section in a set up configuration, and
      (9) a block Y-shaped support unit which includes
         (a) a first leg having a first end pivotably connected to the second end of the first connecting link and a second end,
         (b) a second leg having a first end pivotably connected to the second end of the second connecting link and a second end,
         (c) a first transverse leg having a first end connected to the second end of the first leg of the block Y-shaped support unit and a second end,
         (d) a second transverse leg having a first end connected to the second end of the second leg of the block Y-shaped support unit and a second end,
         (e) the second ends of the first and second legs of the block Y-shaped support unit being spaced apart from the first end of the seat section,
         (f) a first longitudinal arm having a first end connected to the second end of the first transverse leg of the block Y-shaped support unit and a second end, and
         (g) a second longitudinal arm having a first end connected to the second end of the second transverse leg of the block Y-shaped support unit and a second end;
   C) a first wheel unit rotatably connected to the second ends of the first support arm, the first connecting link and the first leg of the Y-shaped support unit;
   D) a second wheel unit rotatably connected to the second ends of the second support arm, the second connecting link and the second leg of the Y-shaped support unit;
   E) a third wheel unit rotatably connected to the second ends of the longitudinal leg of the Y-shaped support unit, the first longitudinal arm of the block Y-shaped support unit and the second longitudinal arm of the block Y-shaped support unit;

F) the seat section and the frame section being collapsible to move between a deployed orientation with the wheel units being located spaced apart from the seat section and a folded orientation with the wheel units located closely adjacent to the seat section with the third wheel unit located between the first and second wheel units.

2. The stroller defined in claim 1 wherein the seat section is formed of flexible material.

3. The stroller defined in claim 2 in which the first end of the seat section is attached to the first and second legs of the block Y-shaped support unit.

4. A stroller comprising:

A) a seat unit;

B) a frame unit for supporting the seat unit, the frame unit including two Y-shaped supporting units and links connecting the frame units together in a manner which allows the two frame units to collapse on each other and lie adjacent to the seat unit in a collapsed configuration and to extend into a seat unit supporting orientation in a deployed orientation; and C) a plurality of wheel units connected to the frame units.

5. The stroller defined in claim 1 wherein the wheel units are pivotable between a deployed condition in which the wheel units are oriented to roll over a supporting surface and a stored condition in which the wheel units are oriented at an angle with respect to the deployed condition.

6. The stroller defined in claim 5 wherein the wheel units are pivotable between a deployed condition in which the wheel units are oriented to roll over a supporting surface and a stored condition in which the wheel units are oriented at an angle with respect to the deployed condition.

* * * * *